(12) United States Patent
Sutanto

(10) Patent No.: US 6,847,649 B2
(45) Date of Patent: Jan. 25, 2005

(54) METHODS, SYSTEMS AND COMPUTER PROGRAM PRODUCTS FOR ACCESSING AN EMBEDDED WEB SERVER ON A BROADBAND ACCESS TERMINAL

(75) Inventor: Surja Sutanto, Lynchburg, VA (US)

(73) Assignee: Ericsson Inc., Plano, TX (US)

( * ) Notice: Subject to any disclaimer, the term of this patent is extended or adjusted under 35 U.S.C. 154(b) by 307 days.

(21) Appl. No.: 09/939,007

(22) Filed: Aug. 24, 2001

(65) Prior Publication Data

US 2003/0039240 A1 Feb. 27, 2003

(51) Int. Cl.[7] .............................................. H04L 12/66
(52) U.S. Cl. ...................................... 370/401; 709/224
(58) Field of Search ................................. 370/351, 352, 370/353, 354, 355, 356, 395.54, 389, 392, 400, 401; 709/223, 224, 245, 227, 228, 238, 217, 218, 219, 220, 221

(56) References Cited

U.S. PATENT DOCUMENTS

| | | | | |
|---|---|---|---|---|
| 5,790,548 A | * | 8/1998 | Sistanizadeh et al. | 370/400 |
| 6,028,848 A | * | 2/2000 | Bhatia et al. | 370/257 |
| 2002/0032725 A1 | * | 3/2002 | Araujo et al. | 709/203 |
| 2002/0032780 A1 | * | 3/2002 | Moore et al. | 709/228 |
| 2002/0044567 A1 | * | 4/2002 | Voit et al. | 370/467 |

FOREIGN PATENT DOCUMENTS

| | | | | |
|---|---|---|---|---|
| EP | 0 854 599 A2 | 7/1998 | | H04J/3/00 |
| EP | 1 119 139 A2 | 7/2001 | | H04L/12/28 |

OTHER PUBLICATIONS

International Search Report for PCT/US 02/26823; Date of Mailing Nov. 28, 2002.

* cited by examiner

*Primary Examiner*—Kenneth Vanderpuye
*Assistant Examiner*—Duc Duong

(57) ABSTRACT

Methods, systems and computer program products are provided for accessing an embedded web server of a broadband access terminal by monitoring communications on at least one of a wide area network connection and a local area network connection of the broadband access terminal so as to determine a domain name server and/or a network gateway associated with the wide area network and accessed by a user terminal using the broadband access terminal. When the wide area network connection of the broadband access terminal is detected as unavailable, the broadband access terminal responds to communications from the user terminal to the domain server and/or the network gateway as if the domain name server and/or network gateway are accessible over the wide area network.

35 Claims, 11 Drawing Sheets

METHODS, SYSTEMS AND COMPUTER PROGRAM PRODUCTS FOR ACCESSING AN EMBEDDED WEB SERVER ON A BROADBAND ACCESS TERMINAL

BACKGROUND OF THE INVENTION

The present invention relates to the field of communications in general and more particularly to broadband access such as digital subscriber line, cable or satellite network communications.

Broadband access terminals, such as cable modems, digital subscriber line (DSL) modems and satellite modems, typically provide high-speed, always-on, connections to the Internet using Transmission Control Protocol/Internet Protocol (TCP/IP). In order to facilitate rapid deployment of broadband services, it may be beneficial that access terminals located at a customer's premises be capable of providing diagnostic information to a user. Such diagnostic information may be provided, for example, by an embedded web server in the broadband access terminal which may be accessed by a web browser or the like using, for example, the hypertext transport protocol (HTTP) and TCP/IP.

In certain conventional broadband access terminals (BATs), a web server, dynamic host configuration protocol (DHCP) server, and domain name server (DNS) hi-jack capabilities are embedded in the BAT. The embedded DHCP server, typically, assigns a private IP address to a user's equipment, such as a personal computer or the like, when the wide area network (WAN) link is unavailable. The DNS hi-jack function intercepts DNS queries for a predefined universal resource locator (URL) and responds with the embedded web server's IP address. Such BATs typically allow access to diagnostic web pages provided by the embedded web server when the WAN link is available immediately after the BAT is powered up or when the WAN link is not available when the BAT is powered up such that, when the user's equipment is later powered up, it will obtain an IP address from the embedded DHCP server.

Unfortunately, conventional BATs, as described above, may fail to provide access to the embedded web server to a user's terminal if, after some time of normal operation, the WAN link becomes unavailable. In such a case, the user's equipment has, typically, been assigned a global routable IP address by a DHCP server of a service provider which is accessible over the WAN link. The global routable IP address, typically, has a relatively long lease (e.g. 1 day to 1 week). When a user tries to access the embedded web server of the BAT, the embedded web server may be unavailable because an entry corresponding to the embedded web server in an address resolution protocol (ARP) cache in the user's equipment has expired. Entries in an ARP cache typically expire in a relatively short period of time (e.g. 10 minutes). The web server may be accessed if the user reboots the user's equipment or reconfigures the equipment, but such an operation may be unsuitable, for example, because a typical user may be non-technical or because potentially important diagnostic information may be lost in the reboot process.

SUMMARY OF THE INVENTION

Embodiments of the present invention provide methods, systems and computer program products for accessing an embedded web server of a broadband access terminal by monitoring communications on at least one of a wide area network connection and a local area network connection of the broadband access terminal so as to determine a domain name server and/or a network gateway associated with the wide area network and accessed by a user terminal using the broadband access terminal. When the wide area network connection of the broadband access terminal is detected as unavailable, the broadband access terminal responds to communications from the user terminal to the domain name server and/or the network gateway as if the domain name server and/or network gateway are accessible over the wide area network.

In particular embodiments of the present invention, communications are monitored by identifying a dynamic host configuration protocol (DHCP) packet destined for the user terminal, extracting an Internet Protocol (IP) address of the user terminal from the identified DHCP packet and extracting a Media Access Control (MAC) address of the user terminal from the identified DHCP packet. An IP address of the domain name server or the network gateway is also extracted from the identified DHCP packet. A MAC address of the domain name server or the network gateway is determined based on the IP address of the domain name server or the network gateway and the IP address of the user terminal, the MAC address of the user terminal, the IP address of the domain name server or the network gateway and the MAC address of the domain name server or the network gateway are associated with each other.

DETAILED DESCRIPTION

Figure 1:
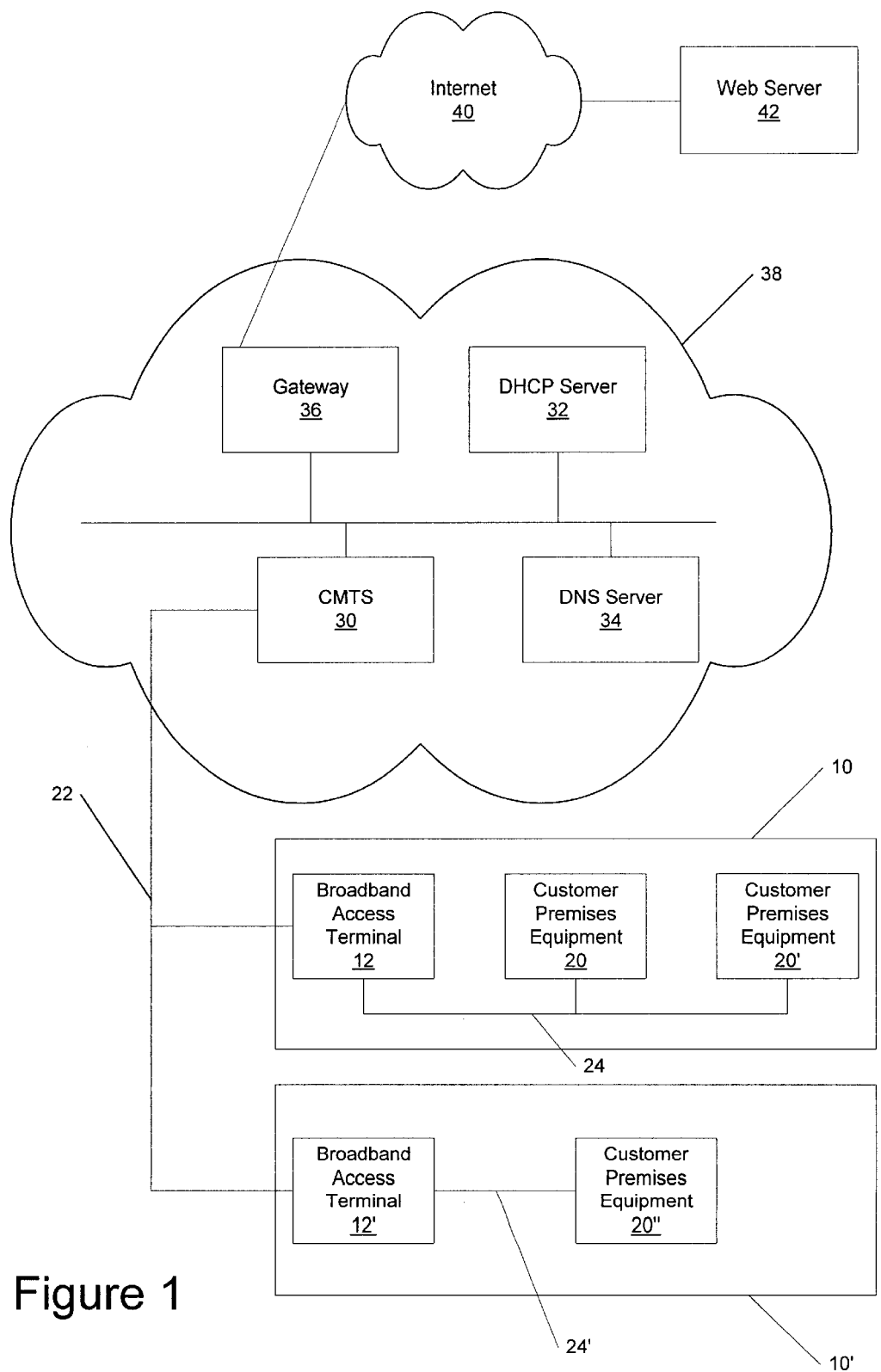
FIG. 1 is a block diagram of a broadband access network system suitable for incorporating embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block and/or flow diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block and/or flow diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Embodiments of the present invention provide for accessing an embedded web server in a broadband access terminal where the web server and user terminal's connected to the broadband access terminal are on different subnets. In such cases, the broadband access terminal may provide a response to a layer 2 discovery message, such as an ARP response to an ARP request, on behalf of a gateway or domain name server (DNS) if the gateway or DNS is inaccessible. Thus, the broadband access terminal acts as an ARP proxy to refresh the ARP cache of the user terminal so that a DNS request for a URL of the embedded web server may be intercepted by the broadband access terminal and the IP address of the embedded web server may be provided. The user terminal may, thereby, access the embedded web server even when the link to the DNS is unavailable.

FIG. 1 illustrates a broadband access network system incorporating embodiments of the present invention. As seen in FIG. 1, end user premises 10, 10' utilize a broadband access terminal 12, 12' to provide communication between a local area network (LAN) 24, 24' at the end user premises 10, 10' and a wide area network (WAN) 22 with access to a service provider network 38. The local area network 24, 24' at the customer premises 10, 10' provides access to the broadband access terminal 12, 12' to customer premises equipment 20, 20', 20" (also referred to herein as "user terminals"). For purposes of illustration, the broadband access terminals 10, 10' are illustrated as cable modems which connect to a cable modem termination system (CMTS) 30 which acts as a gateway to the service provider network 38. However, broadband access techniques other than cable modems may also be utilized in embodiments of the present invention, such as digital subscriber line (DSL) or satellite communications modems. Furthermore, the customer premises equipment 20, 20', 20" may be any device capable of requesting a web page from a web server, such as a personal computer, personal digital assistant (PDA), web enabled telephone, or the like (collectively referred to herein as a user terminal).

As is further illustrated in FIG. 1, the service provider network 38 may include a dynamic host configuration protocol (DHCP) server 32 which assigns Internet Protocol (IP) addresses to devices, such as the broadband access terminals 12, 12' and the customer premises equipment 20, 20', 20". A domain name server (DNS) 34 may also be provide so as to resolve domain names to an IP address. Additionally, a gateway 36 may provide access from the service provider network 38 to the Internet 40 or other such networks, so as to allow access to a web server 42 which is outside the service provider network 38.

The broadband access terminals 12, 12' function as a layer 2 bridge that bridges Ethernet packets between LAN and WAN interfaces. The broadband access terminals 12, 12' are also IP hosts. The broadband access terminal 12, 12' is, typically, assigned an IP address by the DHCP server 32. This IP address will, typically, be a private address. After the broadband access terminal is powered, a user terminal 2,20', 20" is typically also powered. The user terminal 20, 20', 20" is assigned an IP address by the DHCP server 32. The user terminal 20, 20', 20" will typically be assigned a global routable IP address which is in a different subnet from the IP address assigned to the broadband access terminal 12, 12'.

While a particular network architecture is illustrated in FIG. 1, embodiments of the present invention may be utilized in other network architectures. For example, additional customer premises 10, 10' could be utilized as well as other configurations of the service provider network 38.

Similarly, while the present invention is described herein with reference to a connection between a wide area network and a local area network, as will be appreciated by those of skill in the art, embodiments of the present invention may be useful in broadband access terminals between two local area networks and/or between two wide area networks.

Figure 2:
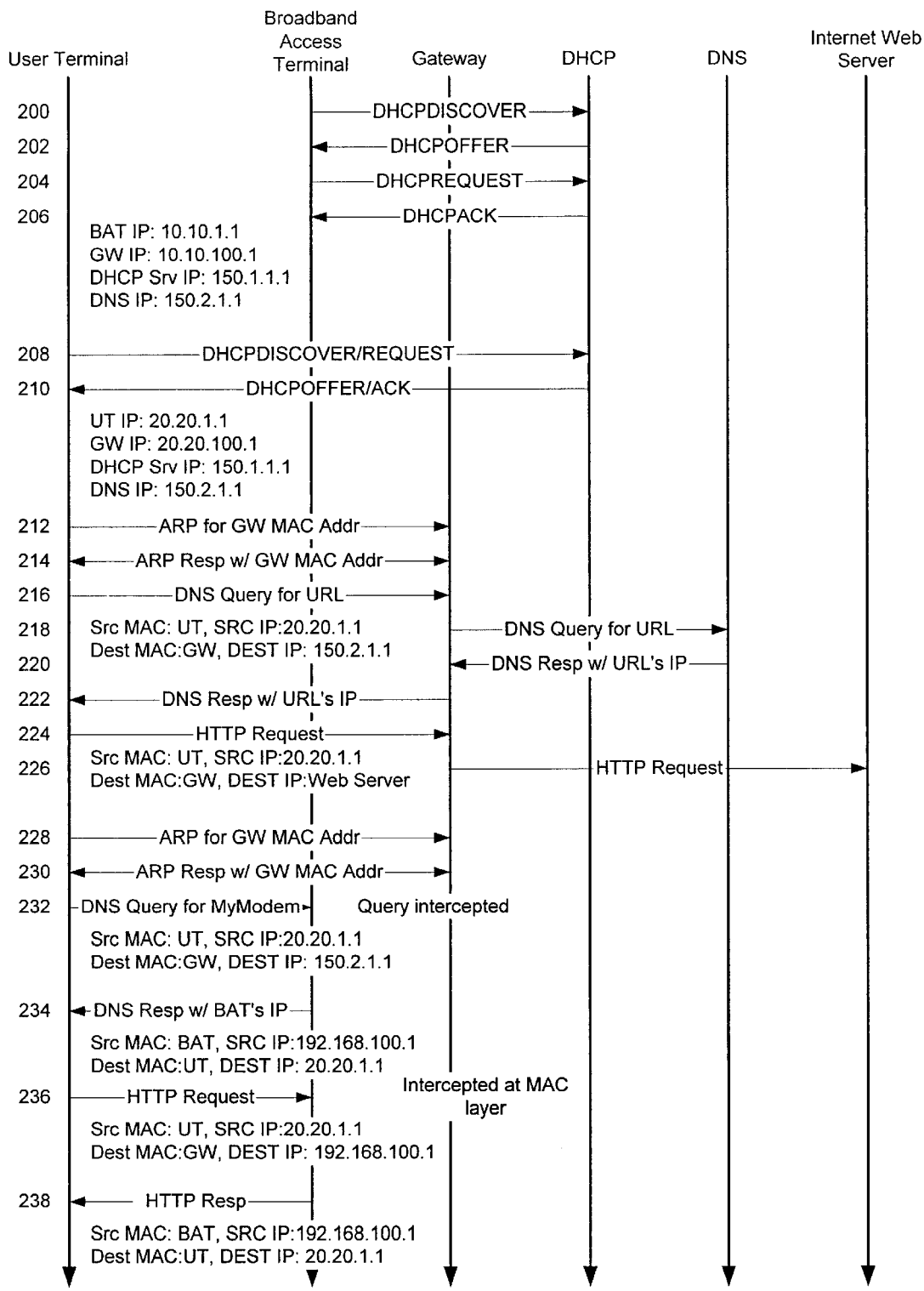
FIG. 2 is a flow diagram illustrating conventional operations for accessing an embedded web server when a wide area network connection is available.

FIG. 2 is a data flow diagram illustrating an example of certain operations of a broadband access terminal when both a WAN and a LAN link are available. In the example illustrated in FIG. 2, the broadband access terminal is assigned a fixed IP address, such as 192.168.100.1. During the power-up sequence of the broadband access terminal 12, 12', the broadband access terminal 12, 12' is accessible from the LAN 24, 24' side even before it gets an IP address assignment form the DHCP server 32. For example, a user can point a browser of the user terminal 20, 20', 20" from the LAN 24, 24' side to the IP address 192.168.100.1 to get diagnostic information. Alternatively, the user terminal 20, 20', 20" can use a predefined URL, such as MyModem, instead of the IP address 192.168.100.1, to get such diagnostic information.

After the broadband access terminal 12, 12' obtains an IP address from the DHCP server 32, the broadband access terminal 12, 12' still maintains the fixed default address 192.168.100.1. This address remains accessible from the LAN 24, 24' side only. Thus, after the broadband access terminal 12, 12' finishes its power-up sequence, it typically has at least two IP address, that assigned by the DHCP server 32 and the fixed IP address.

In the present example, the IP address assigned by the service provider to the broadband access terminal 12, 12' is a private IP address, such as 10.10.1.1. The service provider also assigns a global IP address to a user terminal, such as 20.20.1.1. Furthermore, in the present example, the CMTS 30 is the default gateway for the broadband access terminal 12, 12' and the user terminal 20, 20', 20". Also, as discussed above, the broadband access terminal 12, 12' includes a DHCP server, a web server and the ability to intercept and respond to DNS queries containing a predefined string, such as the URL "MyModem."

Turning to the specifics of FIG. 2, when the broadband access terminal 12, 12' is powered up, it initializes and sends a DHCPDISCOVER to the DHCP server 32 through a gateway, such as the CMTS 30 (line 200). The DHCP server 32 responds with a DHCPOFFER (line 202). In response to the DHCPOFFER, the broadband access terminal 12, 12' sends a DHCPREQUEST to the DHCP server 32 (line 204) and receives a DHCPACK from the DHCP server 32 (line 206). In the present example, the broadband access terminal 12, 12' is assigned the IP address of 10.10.1.1, the gateway IP address is identified as 10.10.100.1, the DHCP server 32 IP address is identified as 150.1.1.1 and the DNS server 34 IP address is identified as 150.2.1.1. At this point, the broadband access terminal 12, 12' has successfully completed its initialization.

When a user terminal 20, 20', 20" is powered on, the user terminal 20, 20', 20" sends a DHCPDISCOVER and DHCPREQUEST to the DHCP server 32 (line 208) and receives back a corresponding DHCPOFFER and DHCPACK (line 210). In the present example, the user terminal 20, 20', 20" is assigned an IP address of 20.20.1.1, the gateway IP address is identified as 20.20.100.1, the DHCP server 32 IP address is identified as 150.1.1.1 and the DNS server 34 IP address is identified as 150.2.1.1.

When a user of a user terminal 20, 20', 20" inputs a URL to point a browser to a web site, the user terminal 20, 20', 20" resolves the URL by sending a DNS query to the DNS server 34. Because the DNS server 34 is not on the same subnet as the user terminal, the user terminal 20, 20', 20" must send the DNS query to the DNS server 34 through the gateway, e.g. the CMTS 30. To do this, the user terminal 20, 20', 20" sends an ARP request to the IP address of the gateway (line 212). The gateway sends an ARP response containing its MAC address (line 214). The user terminal then sends the DNS query to the gateway using the received MAC address (line 216) and the gateway sends the query on to the DNS server 34 (line 218). The DNS server 34 responds to the DNS query with the URL's IP address (line 220) and this response is passed through the gateway to the user terminal 20, 20', 20" (line 222). An HTTP request to the website may then be sent to the IP address through the gateway (lines 224 and 226). These operations may continue as, for example, the user surfs the Internet.

The user of a user terminal 20, 20', 20" can also point a browse to the URL "MyModem." If an ARP table of the user terminal (i.e. a table in the user terminal where MAC addresses are associated with IP addresses) is empty, because the DNS server 34 is on a different subnet, the user terminal 20, 20', 20" will send an ARP request for the gateway MAC address (line 228), receive the response (line 230) and send a DNS query for the URL "MyModem" specifying the DNS server 34 as the destination IP address of the query. However, because the URL is "MyModem," the broadband access terminal 12, 12' intercepts the query (line 232) and sends a DNS response with the fixed IP address (192.168.100.1) of the broadband access terminal 12, 12' (line 234). The user terminal 20, 20', 20" sends an HTTP request to the gateway and the broadband access terminal 12, 12' detects that the IP address is its own and intercepts the request (line 236) and sends the appropriate response (line 238).

Figure 3:
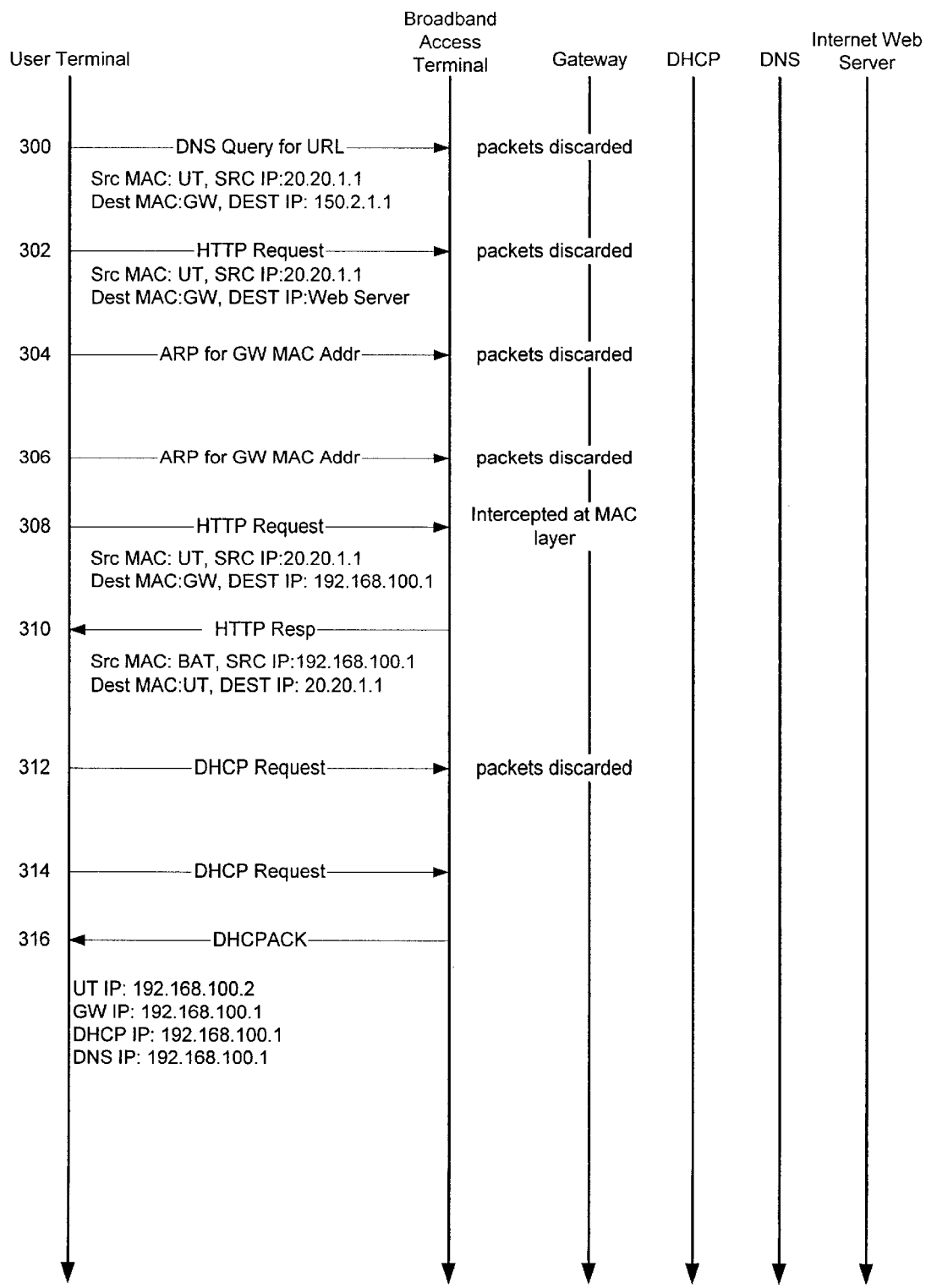
FIG. 3 is a flow diagram illustrating operations of a conventional broadband access terminal in accessing an embedded web server when a wide area network connection is unavailable.

The operations illustrated in FIG. 2 are carried out by the broadband access terminal 12, 12' according to embodiments of the present invention but may also be carried out by conventional broadband access terminals with embedded web servers. Operations of the flow diagrams of FIG. 3, however, illustrate potential shortcomings of such conventional broadband access terminals in the event that the WAN link is unavailable. As is seen in FIG. 3, if the WAN link is unavailable and, assuming that the gateway MAC address is still valid in the user terminal ARP table, when the user terminal sends a DNS query for a URL to the MAC address of the gateway, it is received by a conventional broadband access terminal but is discarded because the WAN is no longer available (line 300). Similarly, if the user points the browser to a previously visited web site with a cached IP address, the HTTP request is also discarded (line 302). If the user tries to access the URL "MyModem" to diagnose the problem and the URL has not been previously resolved, i.e., if the ARP table does not have a valid entry for the gateway and the DNS is on another subnet, a conventional broadband access terminal will send an ARP request for the MAC address of the gateway, but this too will be discarded (line 304). Similarly, if the user terminal points a browser to the fixed address of a broadband access terminal, such as 192.168.100.1, and the ARP table is empty, an ARP request for the gateway will be performed and will fail as the ARP request will be discarded (line 306).

In such a situation, the user could modify the IP address of the user terminal to be on the same subnet as the fixed IP address of the conventional broadband access terminal, issue the "route add" command to add the network 192.168/16 to the user terminal's routing table, issue "ipconfig/release"

and "ipconfig/renew" commands or reboot the user terminal. If the user terminal's ARP table contains the gateway MAC address, an HTTP request to the fixed IP address of the conventional broadband access terminal (line 308) should result in a response from the embedded web server (line 310). However, as a typical ARP table of a user terminal is flushed every 5 to 10 minutes, it may be unreliable to rely on the contents of the ARP table of a user terminal to access the embedded web server.

As is further illustrated in FIG. 3, if the user terminal's lease expires while the WAN is unavailable, the user terminal will initiate sending a DHCPREQUEST to the DHCP server 32, which will fail (line 312). After a timeout, the user terminal will broadcast a DHCPDUISCOVWER or DHCPREQUEST (line 314) which will be responded to by the DHCP server of the conventional broadband access terminal (line 316). The user terminal would then be assigned an IP address on the same subnet as the fixed IP address of the conventional broadband access terminal and, therefore, would be able to access the embedded web server. However, leases for IP addresses are typically about 1 week in duration. Accordingly, relying on the renewal of the lease of the user terminal IP address may only provide access to the embedded web server occasionally.

Figure 4:
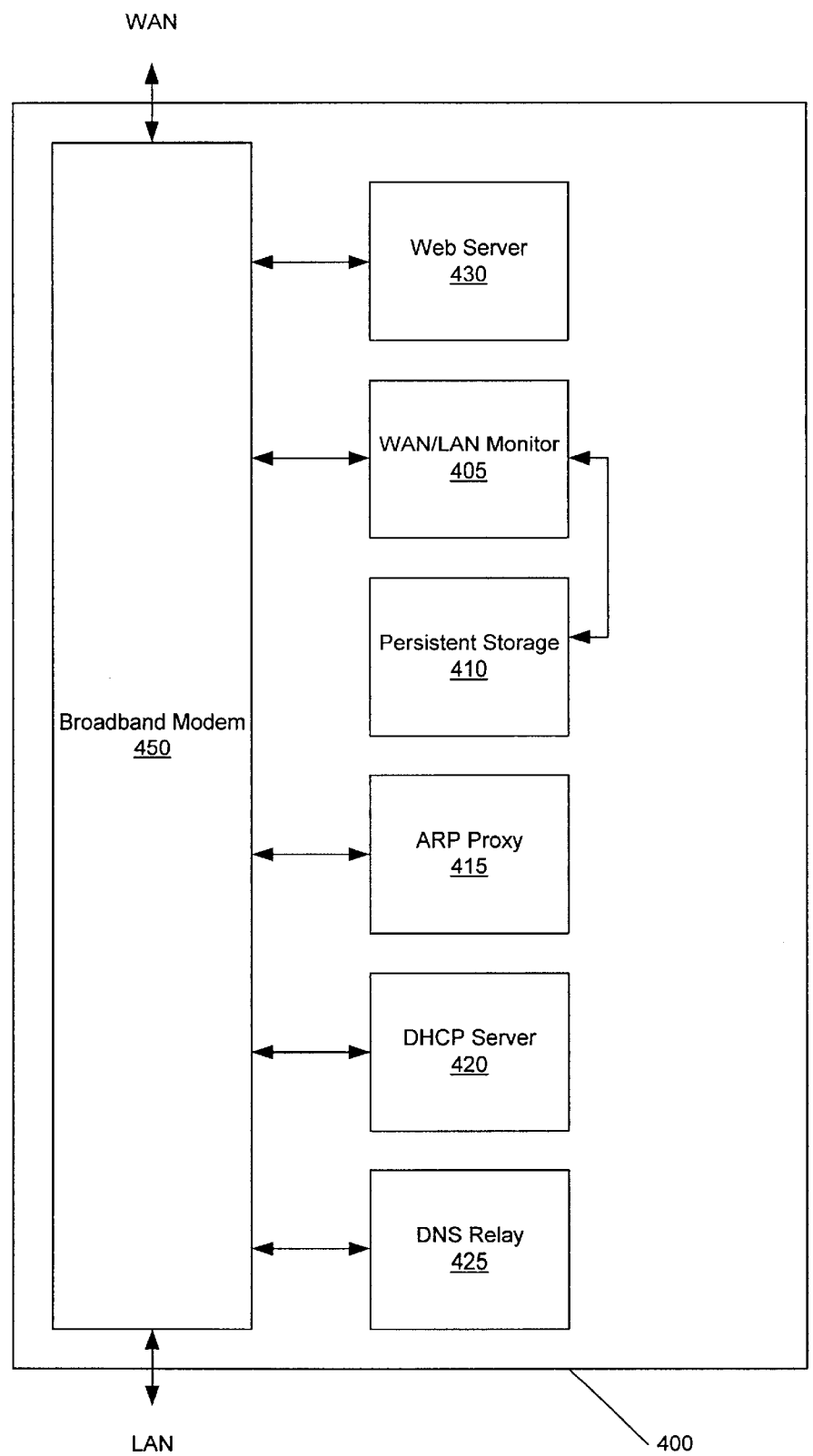
FIG. 4 is a block diagram of a broadband access terminal according to embodiments of the present invention.

FIG. 4 is a block diagram that illustrates a broadband access terminal, such as the broadband access terminals 12, 12', according to embodiments of the present invention. As seen in FIG. 4, the broadband access terminal 400 includes a broadband modem circuit 450 which provides an interface to a LAN and a WAN. In addition to the broadband modem circuit 450, the broadband access terminal 400 also includes a web server circuit 430, a WAN/LAN monitor circuit 405, a persistent storage circuit 410, and an ARP proxy circuit 415. The broadband access terminal 400 may also include a DHCP server 420 and a DNS relay circuit 425. The broadband modem circuit 450, the web server circuit 430 and the DHCP server 420 illustrated in FIG. 5 may be operated as in a conventional broadband access terminal and will, therefore, not be described further herein except as such operations relate to particular aspects and/or embodiments of the present invention.

As described herein, the WAN/LAN monitor circuit 405 monitors communications on the LAN and/or WAN to establish a relationship between network addresses and layer 2 addresses of user terminals and network gateways and/or domain name servers. This relationship may be stored in the persistent storage circuit 410. The ARP proxy circuit 415 utilizes the relationship information to respond to layer 2 discovery requests on behalf of a network gateway and/or domain name server if the WAN link is unavailable. The DNS relay circuit 425, similarly, forwards DNS messages on the WAN in the event that a spoofed layer 2 address is provided in response to a layer 2 discovery message when the WAN is unavailable.

While a particular division of functions is illustrated in FIG. 4, as will be appreciated by those of skill in the art, other divisions may also be provided while still benefiting from the teachings of the present invention. For example, the persistent storage 410 could be incorporated in one of the other circuits, such as the broadband modem 450 or the WAN/LAN monitor 405. Thus, the present invention should not be construed as limited to the particular divisions illustrated in FIG. 4 but is intended to include other configurations capable of carrying out the operations described herein.

Figure 5:
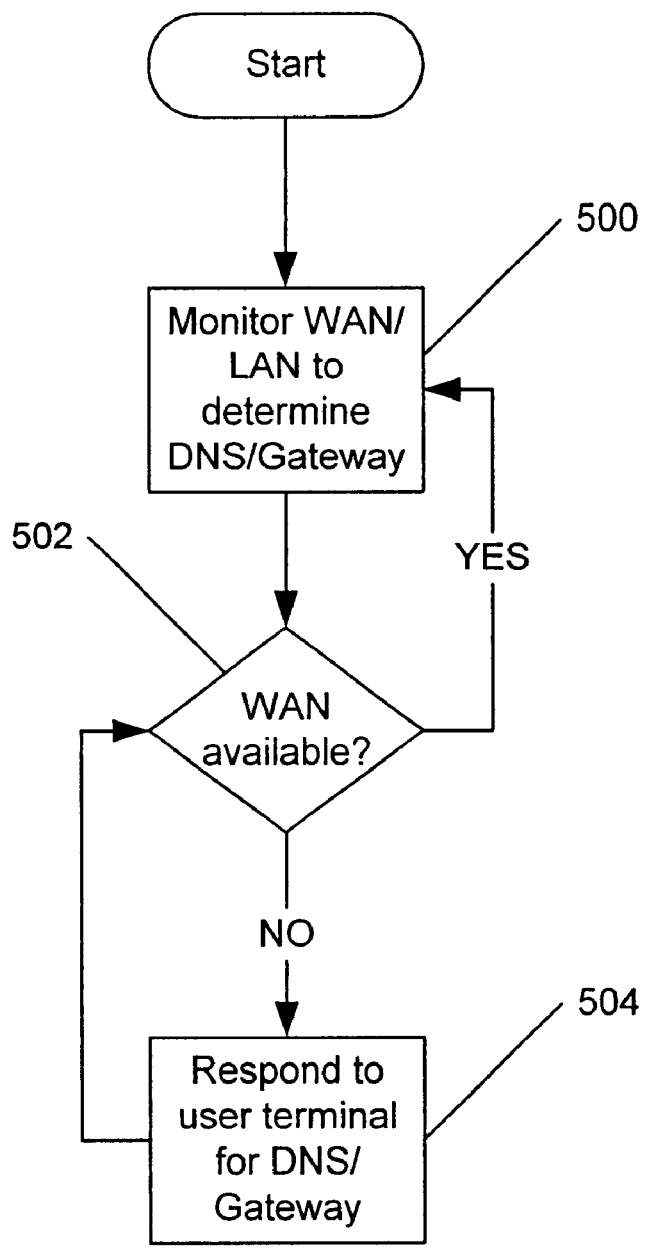
FIG. 5 is a flowchart illustrating operations of a broadband access terminal according to embodiments of the present invention.

In general, operations of the broadband access terminal 400 according to embodiments of the present invention are illustrated in FIG. 5. As seen in FIG. 5, the WAN and/or the LAN is monitored to determine the network address (e.g. routing layer address) and the layer 2 address (e.g. MAC address) of a network gateway or a domain name server and the network address and layer 2 address of a user terminal associated with the LAN of the broadband access terminal 400 (block 500). When the WAN is detected as unavailable (block 502), the broadband access terminal 400 responds to layer 2 discovery communications on behalf of the DNS and/or gateway with layer 2 address information obtained by the monitoring operations (block 504).

Figure 6A:
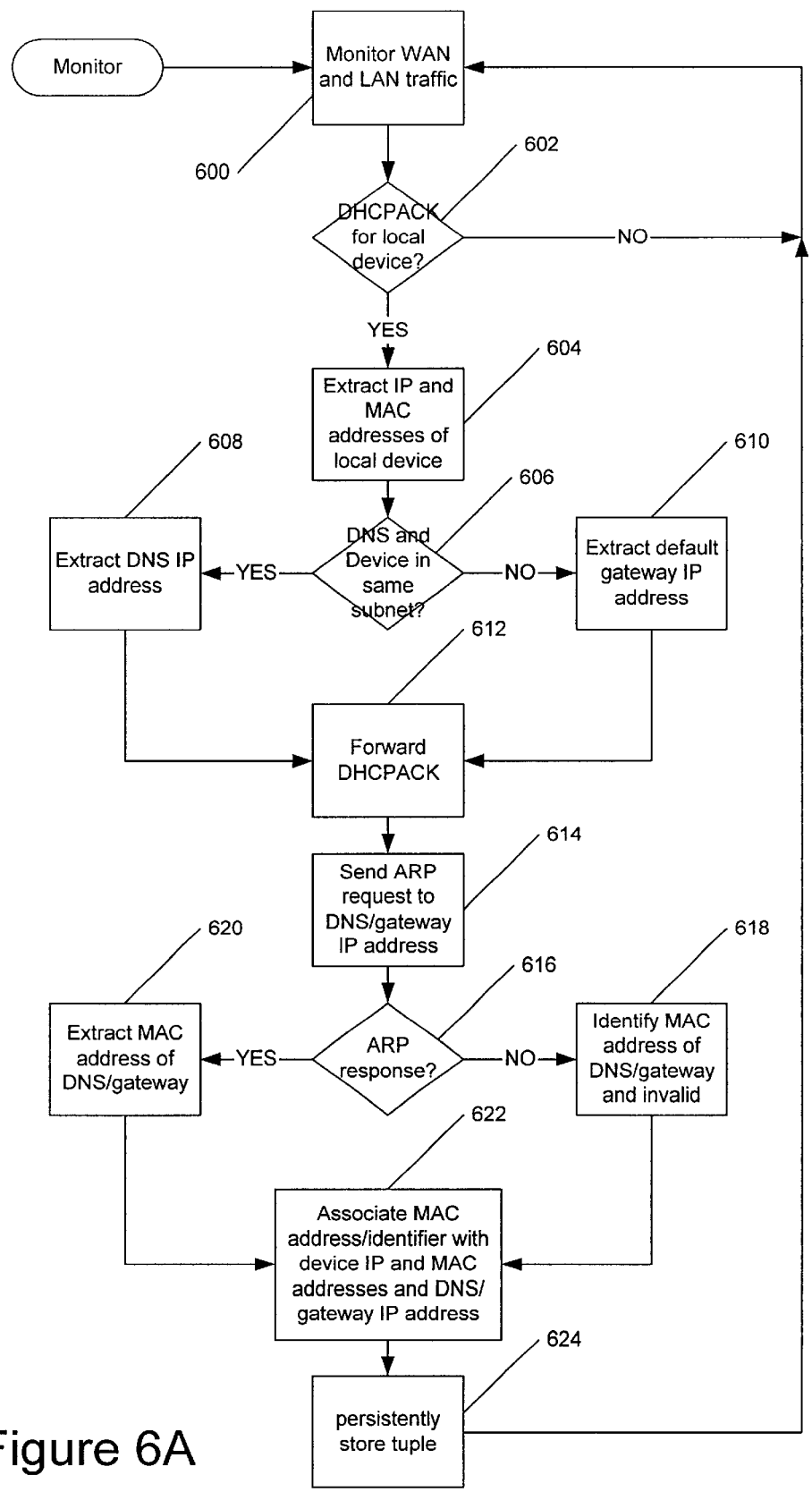
FIGS. 6A, 6B, 6C and 6D are flowcharts illustrating operations of a monitor module/circuit, an ARP proxy module/circuit, a DNS relay module/circuit and a DHCP server of a broadband access terminal, respectively, according to embodiments of the present invention.

FIGS. 6A through 6D are more detailed flowcharts of embodiments of the present invention. FIG. 6A illustrates operations carried out by embodiments of the WAN/LAN monitor circuit 405. As seen in FIG. 6A, the WAN/LAN monitor circuit 405 monitors the WAN/LAN message traffic (block 600) until a DHCPACK message for a user terminal on the LAN (i.e. a local device) is detected (block 602). When the DHCPACK is detected, the IP address of the local device and the MAC address of the local device are extracted from the DHCPACK (block 604). The DNS information in the DHCPACK is analyzed to determine if the DNS and the local device are in the same subnet (block 606). If the DNS and the local device are in the same subnet (block 606), the DNS IP address is extracted from the DHCPACK (block 608). If the DNS and the local device are not in the same subnet (block 606), the gateway IP address is extracted from the DHCPACK (block 608). In either case, the DHCPACK is forwarded to the local device (block 612).

The WAN/LAN monitor circuit 405 sends an ARP request to the IP address of the DNS or the gateway (block 614) and waits for a response (block 616). If no response is received (block 616), for example, if the WAN becomes unavailable before a response is received, the MAC address associated with the DNS or gateway is identified as invalid (block 618). If a response is received (block 616), the MAC address is extracted from the response (block 620). In either case, the MAC address from the response or the invalid identifier is associated with the local device IP address and MAC address and the DNS or gateway IP address (block 622) and this tuple is persistently stored, for example, in the persistent storage 410 (block 624).

Additionally, in further embodiments of the present invention, if the MAC address in the tuple is indicated as being invalid, the ARP request may be periodically resent when the WAN is available until a valid ARP response is received. As is seen from the above discussion, the number of tuples stored will, typically, depend on the number of user terminals and the global IP addresses assigned by the DHCP server at the service provider's network. Each user terminal, preferably only has one tuple. If a user terminal is assigned more than one IP address, the tuple with the latest/newest IP address may replace the tuple with the older IP address. Finally, if the broadband access terminal 400 detects an inbound ARP response with the MAC address of a user terminal's DNS or gateway, the corresponding tuple for the user terminal may be updated with the MAC address from the response.

Figure 6B:
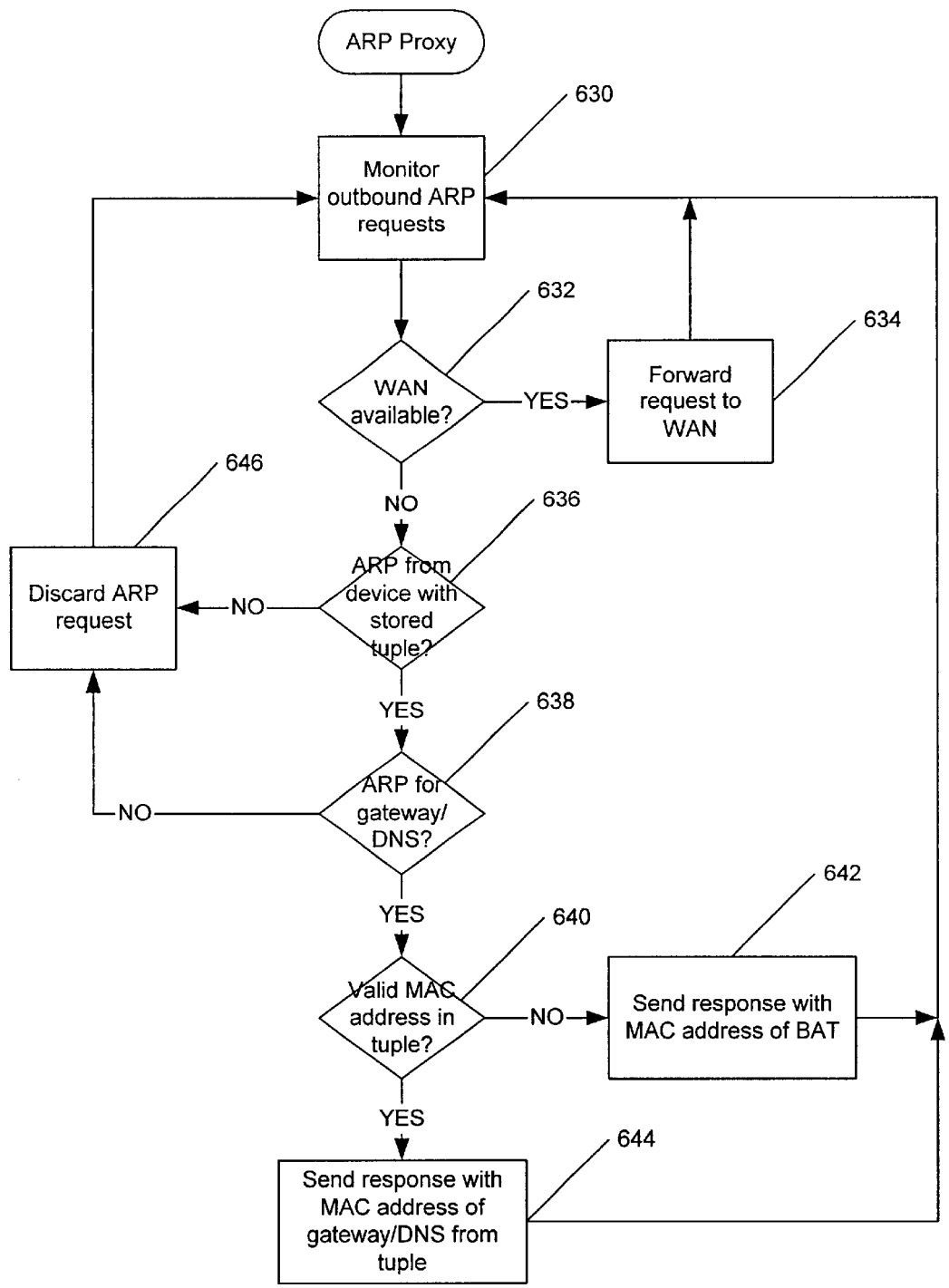

FIG. 6B illustrates operations of the ARP proxy circuit 415 according to embodiments of the present invention. As illustrated in FIG. 6B, the ARP proxy circuit 415 monitors outbound ARP requests from the LAN to the WAN (block 630). If the WAN is available (block 632), the ARP requests are forwarded to the WAN (block 634). If the WAN is not available (block 632), it is determined if the ARP request is from a local device for which a tuple has been stored (block 636). If no tuple has been stored (block 636), the ARP request is discarded (block 646). Such a determination may be made, for example, by comparing the source IP address and/or MAC address of the ARP request with the local device IP addresses and/or MAC addresses of the tuples persistently stored by the WAN/LAN monitor circuit 405. If a tuple has been stored (block 636), it is determined if the ARP is for a gateway or DNS of the tuple (block 638). Such a determination may be made, for example, by comparing the destination IP address of the ARP request with the IP address of the DNS or gateway stored in the tuple associated with the local device IP address and/or MAC address.

If the ARP is not for a gateway or DNS of the tuple (block 638), the ARP request is discarded (block 646). If the ARP is for a gateway or DNS of the tuple (block 638), it is determined if there is a valid MAC address for the gateway or DNS in the tuple (block 640). Such a determination may be made, for example, by determining if an invalid identifier is stored with the tuple as described above. If a valid MAC address for the DNS or gateway is not in the tuple (block 640), an ARP response is sent to the local device using the MAC address of the broadband access terminal 400 as the MAC address for the gateway or DNS (block 642). If a valid MAC address for the DNS or gateway is in the tuple (block 640), an ARP response is sent to the local device using the MAC address of the DNS or gateway from the tuple as the MAC address for the gateway or DNS (block 644).

Figure 6C:
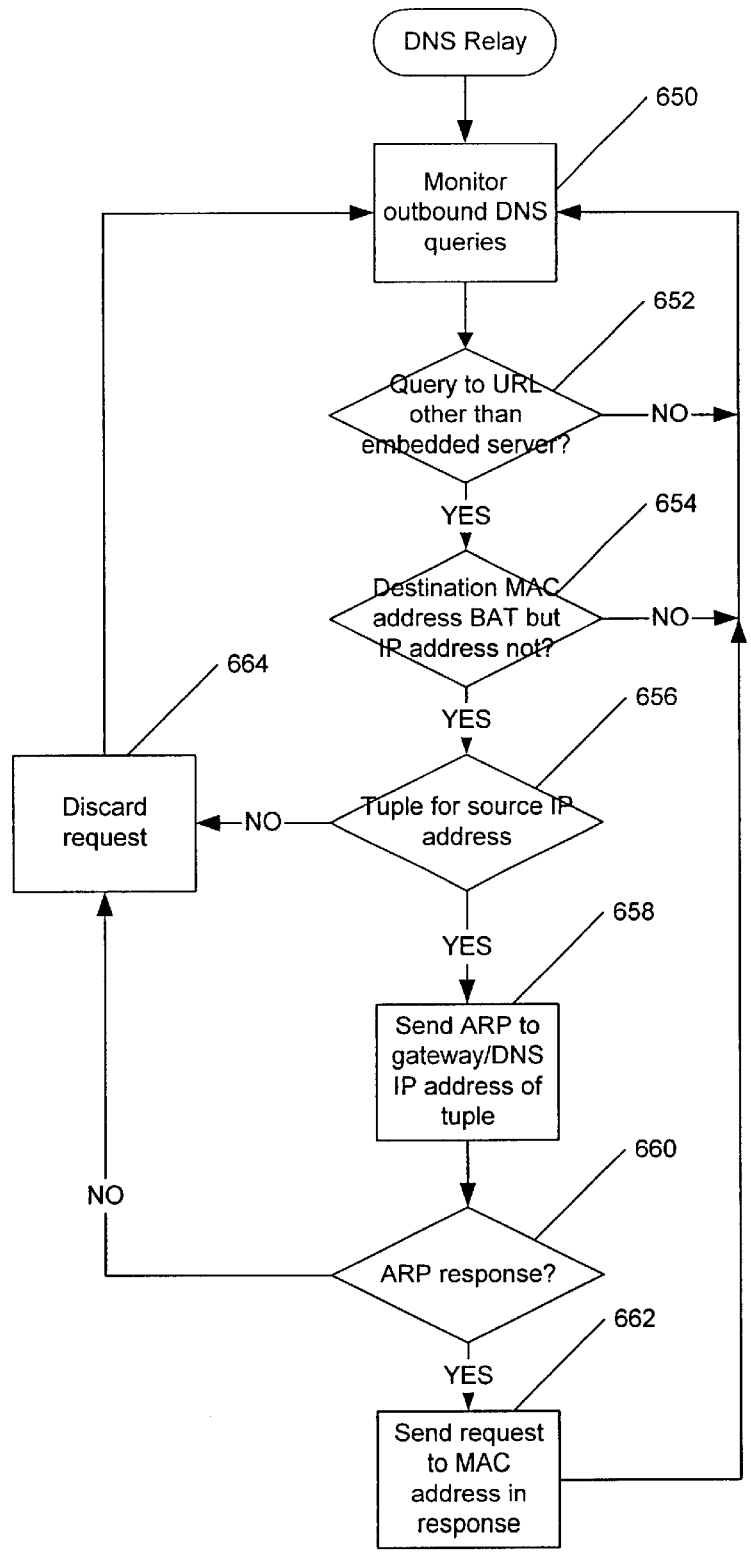

FIG. 6C illustrates operations of a DNS relay circuit 425 according to embodiments of the present invention. The DNS relay circuit 425 is active when the WAN is available and monitors outbound DNS queries from the LAN to the WAN (block 650) and determines if the DNS query is to a URL other than the URL of the embedded web server 430 (block 652). If not, monitoring continues. If the DNS query is to a URL other than the URL of the embedded web server 430 (block 652), it is determined if the destination MAC address of the DNS query is the MAC address of the broadband access terminal 400 (block 654). If not, the monitoring continues. If the destination MAC address of the DNS query is the MAC address of the broadband access terminal 400 (block 654), it is determined if a tuple has been persistently stored for the source IP address of the DNS query (block 656). If not, the DNS query is discarded (block 664). If a tuple has been stored for the source IP address (block 656), an ARP request is sent to the IP address of the gateway or DNS of the tuple (block 658). If no response to the ARP request is received (block 660), the DNS query is discarded (block 664). If a response is received (block 660), the DNS query is sent to the MAC address returned in response to the ARP request (block 662). Preferably, the DNS query is forwarded with no alteration of the IP layer packet.

Thus, as described above, the DNS relay 425 may only rarely be activated. The DNS relay 425 may be activated when the tuple does not have a valid MAC address for the default gateway or DNS, the broadband access terminal 400 has responded to an ARP request with its own MAC address and the user terminal still has an incorrect entry in its ARP table for the default gateway or DNS when the WAN is restored.

Figure 6D:
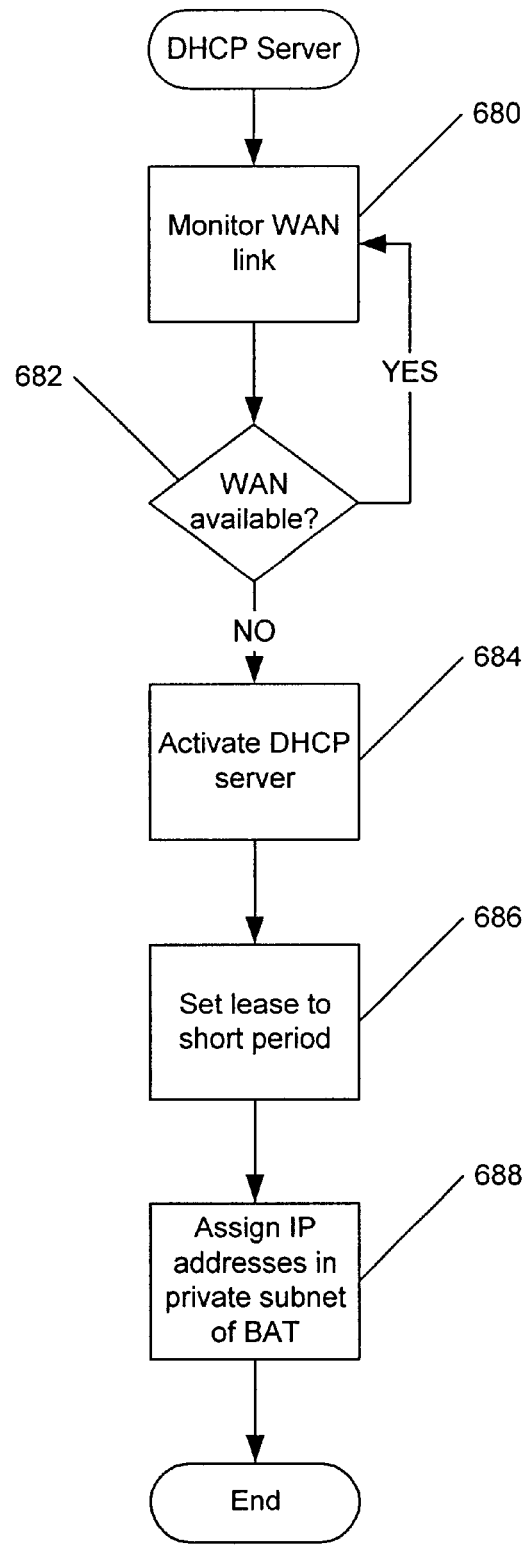

FIG. 6D illustrates operations for control of a DHCP server 420 according to embodiments of the present invention. As illustrated in FIG. 6D, the WAN link is monitored (block 680) until the WAN is not available (block 682). If the WAN link is not available (block 682), the DHCP server 420 is activated (block 684) and the lease period of the DHCP server 420 is set to a very short duration (block 686), such as 10 to 30 seconds. Address in the same subnet as the fixed IP address of the broadband access terminal 400 are assigned by the DHCP server 420 when it is activated (block 688). The DHCP server 420 is deactivated when the WAN link is available.

Figure 7:
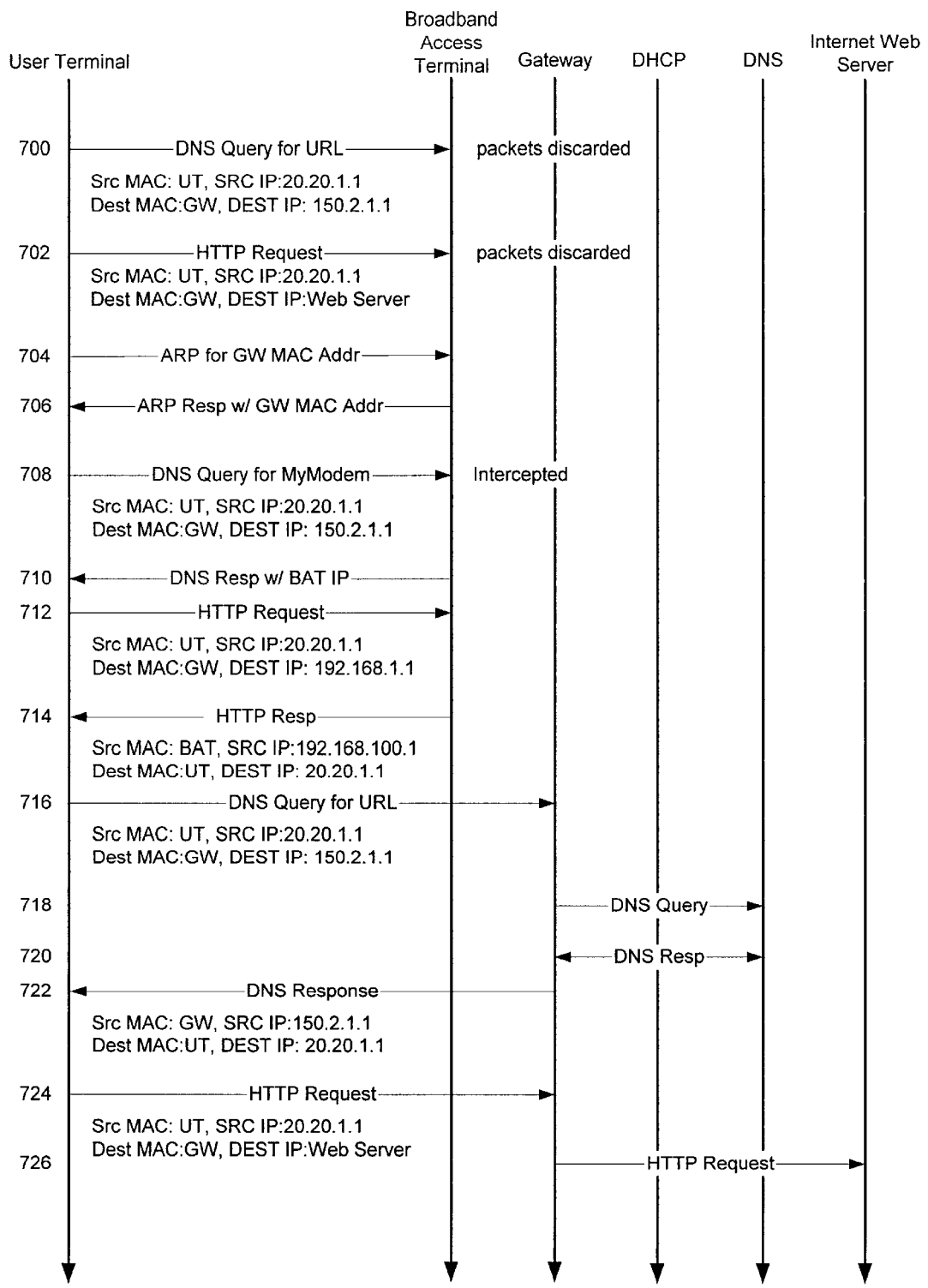
FIG. 7 is a flow diagram illustrating exemplary operations of a broadband access terminal according to embodiments of the present invention.

FIG. 7 is a flow diagram of exemplary operations according to embodiments of the present invention. For the examples in FIGS. 7 and 8, the IP addresses are as described above with reference to FIG. 2. As seen in FIG. 7, if the WAN is unavailable the ARP cache of the user terminal still contains the gateway MAC address, when the user terminal sends a DNS query for a new URL to the broadband access terminal 400 (line 700), no response is received. Similarly, if the user points the web browser of a user terminal to a previously visited web site, the user terminal may still know the web site's IP address and the gateway MAC address and will send an HTTP request to the IP address and MAC address (line 702). However, no response is received because the WAN is unavailable.

If the user points the web browser of a user terminal to the URL "MyModem" and the user terminal must resolve the URL and perform an ARP, the user terminal will send an ARP for the gateway MAC address to the broadband access terminal 400 (line 704). Because there is no WAN available, the broadband access terminal detects the ARP request for the IP address of the gateway from a user terminal on the broadband access terminal's LAN and carries out the ARP proxy operations. Thus, the gateway MAC address is extracted from the stored tuple and an ARP response with the gateway MAC address is sent to the user terminal (line 706). The user terminal then sends a DNS query for the URL "MyModem" using the received gateway MAC address (line 708). The broadband access terminal 400 intercepts the DNS query because it contains the string "MyModem" and responds with a DNS response containing the broadband access terminal's fixed IP address (192.168.100.1) (line 710). The user terminal then sends an HTTP request to the IP address 192.168.100.1 (line 712) and receives a response from the embedded web server 430 (lines 714).

When the WAN is again available, if the browser of a user terminal is pointed to a new web site and the user terminal still has the gateway MAC address cached, the user terminal sends a DNS query for the new web site which is passed through the broadband access terminal 400 to the gateway (line 716). The gateway forwards the DNS query to the DNS server (line 718). The DNS server sends a response to the gateway (line 720) and the gateway sends the response to the user terminal through the broadband access terminal 400 (line 722). The user terminal then sends an HTTP request to the IP address in the DNS response which is routed through the gateway to the web server (lines 724 and 726). Thus, access returns to normal operations immediately upon the WAN becoming available.

Figure 8:
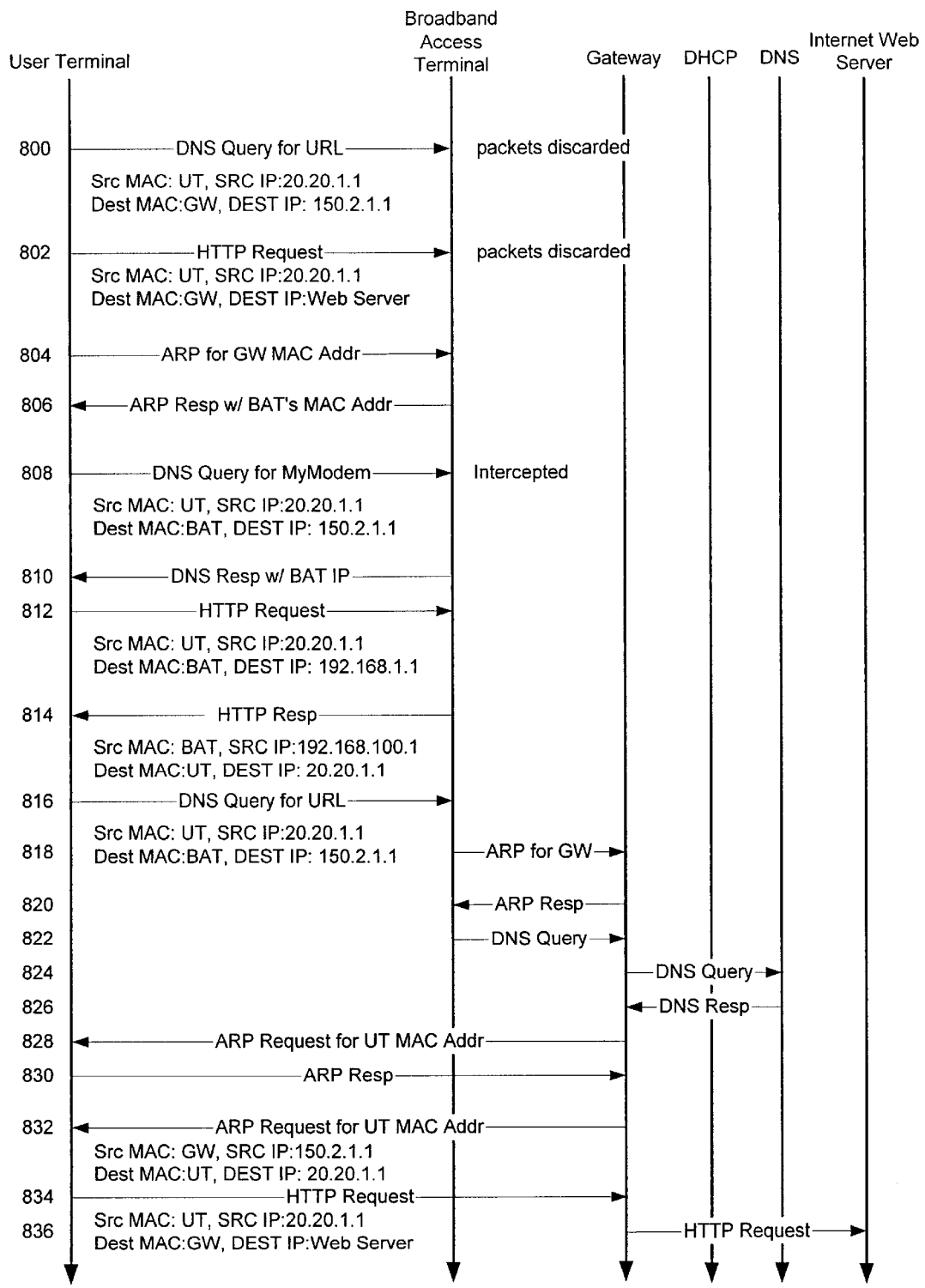
FIG. 8 is a flow diagram illustrating exemplary operations of a broadband access terminal according to embodiments of the present invention if a media access control (MAC) address of a gateway or domain name server (DNS) is invalid.

FIG. 8 illustrates communication flows if the broadband access terminal does not have a valid MAC address for a gateway or DNS in the tuple for a user terminal. Such a condition could arise, for example, if the WAN becomes unavailable before a response to the ARP request sent by the broadband access terminal 400 is received. As seen in FIG. 8, as with FIG. 7, when the WAN is unavailable, DNS queries to URL's other than MyModem and HTTP requests to web servers other than the embedded web server 430 are not responded to (lines 800 and 802). However, if the user points a browser of a user terminal to the URL "MyModem", the user terminal sends an ARP request for the gateway MAC address to the broadband access terminal (line 804). Because the tuple for the user terminal does not contain a valid MAC address for the gateway, the broadband access terminal returns an ARP response with its own MAC address to the user terminal (line 806). The user terminal then sends a DNS query for the URL "MyModem" with the MAC address of the broadband access terminal 400 (line 808) which is intercepted by the broadband access terminal 400 as described above. A DNS response is sent to the user terminal with the fixed IP address of the broadband access terminal 400 (line 810). The user terminal then sends an HTTP request to the IP address 192.168.100.1 and receives a response from the embedded web server 430 (lines 812 and 814).

When the WAN is again available, if the gateway MAC address in the user terminal ARP cache has not timed out, the user terminal may still have the incorrect gateway MAC address (i.e. the MAC address of the broadband access terminal 400) in its ARP cache. Thus, if a browser of the user terminal is pointed to a new URL, the user terminal will send a DNS query for the URL (line 816). However, the MAC address of the DNS query will be the MAC address of the broadband access terminal 400, not the gateway. As described above, the DNS relay circuit 425 of the broadband access terminal 400 detects that the IP address is that of the gateway and the MAC address is incorrect and sends an ARP request to the IP address of the gateway (line 818). The ARP response is received with the gateway MAC address (line 820) and the DNS query is forward to the MAC address of the gateway without any modification to the IP layer packet (line 822). The gateway sends the the DNS query to the DNS server (line 824) which sends a DNS response to the gateway (line 826).

The gateway sends an ARP request to the user terminal (line 828) and receives a response with the MAC address of the user terminal (line 830). The ARP request contains the MAC address and IP address of the gateway and the user terminal updates its ARP cache with this IP address/MAC address information. The gateway then sends the DNS response to the user terminal using the received MAC address and including its own MAC address as the source of the DNS response (line 832). The user terminal will then send an HTTP request to the received IP address using the gateway MAC address as its destination MAC address (line 834) and the HTTP request will be sent on to the web server (line 836). The user terminal will, typically, obtain the correct gateway MAC address when the entry in the ARP cache times out and operations will return to normal thereafter.

The flowcharts, flow diagrams and block diagrams of FIGS. 1, 2, 4, 5, 6A–6D, 7 and 8 illustrate the architecture, functionality, and operation of possible implementations of systems, methods and computer program products for accessing an embedded web server in a broadband access terminal according to various embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of accessing an embedded web server of a broadband access terminal, comprising the steps of:
   monitoring communications on at least one of a wide area network connection and a local area network connection of the broadband access terminal so as to determine at least one of a domain name server and a network gateway associated with the wide area network connection and accessed by a user terminal using the broadband access terminal, said step of monitoring comprising the steps of:
   identifying a dynamic host configuration protocol (DHCP) packet destined for the user terminal;
   extracting an Internet Protocol (IP) address of the user terminal from the identified DHCP packet;
   extracting a Media Access Control (MAC) address of the user terminal from the identified DHCP packet;
   extracting an IP address of the at least one of the domain name server and the network gateway from the identified DHCP packet;
   determining a MAC address of the at least one of the domain name server and the network gateway based on the IP address of at least one of the domain name server and the network gateway; and
   associating the IP address of the user terminal the MAC address of the user terminal, the IP address of the at least one of the domain name server and the network gateway and the MAC address of the at least one of the domain name server and the network gateway;
   detecting that the wide area network connection of the broadband access terminal is unavailable; and
   responding to communications from the user terminal to the at least one of the domain name server and the network gateway as if the at least one of the domain name server and the network gateway are accessible over the wide area network if the wide area network connection is unavailable.

2. The method of claim 1, wherein determining a MAC address of the at least one of the domain name server and the network gateway based on the IP address of the at least one of the domain name server and the network gateway comprises:
   sending an ARP request to the IP address of the at least one of the domain name server and the network gateway; and
   extracting the MAC address of the at least one of the domain name server and the network gateway from a response to the ARP request.

3. The method of claim 1, further comprising persistently storing the IP address of the user terminal, the MAC address of the user terminal, the IP address of the at least one of the domain name server and the network gateway and the MAC address of the at least one of the domain name server and the network gateway.

4. The method of claim 1, wherein responding to communications from the user terminal to the at least one of the domain server and the network gateway as if the at least one of the domain name server and the network gateway are accessible over the wide area network if the wide area network connection is unavailable comprises:
   receiving an address resolution protocol (ARP) request;
   determining if the ARP request is from the user terminal and to at least one of the domain name server and the network gateway; and
   sending an ARP response to the user terminal, the ARP response containing a MAC address of the at least one of the domain name server and the network gateway associated with the user terminal, if the ARP request is from the user terminal.

5. The method of claim 4, wherein determining if the ARP request is from the user terminal and to at least one of the domain name server and the network gateway comprises:
   determining if a source Internet Protocol (IP) address of the ARP request corresponds to an IP address of the user terminal; and
   determining if a destination IP address of the ARP request corresponds to an IP address of the at least one of the domain name server and the network gateway.

6. The method of claim 4, further comprising:
   determining if a valid MAC address of the at least one of the domain name server and the network gateway is associated with the user terminal; and
   wherein sending an ARP response to the user terminal, the ARP response containing a MAC address of the at least one of the domain name server and the network gateway associated with the user terminal, If the ARP request is from the user terminal comprises sending an ARP response to the user terminal, the ARP response containing a MAC address of the at least one of the domain name server and the network gateway associated with the user terminal, if the ARP request is from the user terminal and a valid MAC address of the at least one of the domain name server and the network gateway is associated with the user terminal and sending an ARP response to the user terminal, the ARP response containing a MAC address of the broadband access terminal if a valid MAC address of the at least one of the domain name server and the network gateway is not associated with the user terminal.

7. The method of claim 6, further comprising:
   detecting the availability of the wide area network connection after the wide area network connection has been detected as unavailable; and
   relaying domain name server (DNS) packets to the at least one of the domain name server and the network gateway if a valid MAC address of the at the at least one of the domain name server and the network gateway is not associated with the user terminal when the wide area network connection is detected as available.

8. The method of claim 7, wherein relaying domain name server packets to the at least one of the domain name server and the network gateway if a valid MAC address of the at the at least one of the domain name server and the network gateway is not associated with the user terminal comprises:
   sending an address resolution protocol (ARP) request to a destination IP address of a DNS packet from the user terminal if the destination Internet Protocol (IP) address of the packet is an IP address of the at least one of the domain name server and the network gateway and a valid MAC address of the at least one of the domain name server and the network gateway is not associated with the user terminal; and
   forwarding the DNS packet to a MAC address received in response to the ARP request sent to the destination IP address of the DNS packet.

9. The method of claim 1, wherein the broadband access terminal comprises a cable modem.

10. The method of claim 1, further comprising activating a dynamic host configuration protocol (DHCP) server associated with the broadband access terminal responsive to detecting that the wide area network connection of the broadband access terminal is unavailable.

11. The method of claim 10, wherein the DHCP server assigns Internet Protocol (IP) addresses only in a subnet of a fixed private IP address of the broadband access terminal.

12. The method of claim 11, wherein a lease associated with the EP addresses assigned by the DHCP server is less than 5 minutes.

13. The method of claim 11, wherein a lease associated with the IP addresses assigned by the DHCP server is less than 30 seconds.

14. A broadband access terminal, comprising:
   a broadband modem configured to communicate between a wide area network and a local area network;
   a web server configured with a fixed private Internet Protocol (IP) address;
   a monitor circuit configured to monitor communication on at least one of the wide area network connection and the local area network connection so as to determine at least one of a domain name server and a network gateway associated with the wide area network connection and accessed by a user terminal using the broadband access terminal;
   an address resolution protocol (ARP) proxy circuit configured to respond to communications from the user terminal to the at least one of the domain server and the network gateway if the wide area network connection is unavailable, wherein said ARP proxy circuit is configured to receive an address resolution protocol (ARP) request, determine if the ARP request is from the user terminal and to at least one of the domain name server and the network gateway and send an ARP response to the user terminal, the ARP response containing a MAC address of the at least one of the domain name server and the network gateway associated with the user terminal, if the ARP request is from the user terminal.

15. The broadband access terminal of claim 14, wherein the monitor circuit is further configured to identify a dynamic host configuration protocol (DHCP) packet destined for the user terminal, extract an Internet Protocol (IP) address of the user terminal, a Media Access Control (MAC) address of the user terminal and an IP address of the at least one of the domain name server and the network gateway from the identified DHCP packet, determine a MAC address of the at least one of the domain name server and the network gateway based on the IP address of the at least one of the domain name server and the network gateway and associate the IP address of the user terminal, the MAC address of the user terminal, the IP address of the at least one of the domain name server and the network gateway and the MAC address of the at least one of the domain name server and the network gateway.

16. The broadband access terminal of claim 15, wherein the monitor circuit is configured to determine a MAC address of the at least one of the domain name server and the network gateway based on the IP address of the at feast one of the domain name server and the network gateway by sending an ARP request to the IP address of the at least one of the domain name server and the network gateway and is configured to extract the MAC address of the at least one of the domain name server and the network gateway from a response to the ARP request.

17. The broadband access terminal of claim 15, further comprising persistent storage configured to store the IP address of the user terminal, the MAC address of the user terminal, the IP address of the at least one of the domain name server and the network gateway an d the MAC address of the at least one of the domain name server and the network gateway.

18. The broadband access terminal of claim 14, wherein the ARP proxy circuit determines if the ARP request is from the user terminal and to at least one of the domain name server and the network gateway by determining if a source Internet Protocol (IP) address of the ARP request corresponds to an IP address of the user terminal and determining if a destination IP address of the ARP request corresponds to an IP address of the at least one of the domain name server and the network gateway.

19. The broadband access terminal of claim 14, wherein the ARP proxy circuit is further configured to determine if a valid MAC address of the at least one of the domain name server and the network gateway is associated with the user terminal; and wherein the ARP proxy circuit is configured to send an ARP response containing a MAC address of the at least one of the domain name server and the network gateway associated with the user terminal to the user terminal if the ARP request is from the user terminal and a valid MAC address of the at least one of the domain name server and the network gateway is associated with the user terminal; and wherein the ARP proxy circuit is configured to send an ARP response to the user terminal, the ARP response containing a MAC address of the broadband access terminal, if a valid MAC address of the at least one of the domain name server and the network gateway is not associate with the user terminal.

20. The broadband access terminal of claim 19, further comprising a domain name server (DNS) relay circuit configured to relay packets to the it least one of the domain name server and the network gateway if a valid MAC address of the at least one of the domain name server and the network gateway is not associated with the user terminal.

21. The broadband access terminal of claim 20, wherein the DNS relay circuit is further configured to send an address resolution protocol (ARP) request to a destination IP address of a DNS packet from the user terminal if the destination Internet Protocol (IP) address of the packet is an IP address of the at least one of the domain name server and the network gateway and a valid MAC address of the at least one of the domain name server and the network gateway is not associated with the user terminal and to forward the DNS packet to a MAC address received in response to the ARP request sent to the destination IP address of the DNS packet.

22. The broadband access terminal of claim 14, wherein the broadband access terminal comprises a cable modem.

23. The broadband access terminal of claim 14, further comprising a dynamic host configuration protocol (DHCP) server configured to be activated responsive to detecting that the wide area network connection of the broadband access terminal is unavailable.

24. The broadband access terminal of claim 23, wherein the DHCP is configured to assign Internet Protocol (IP) addresses only in a subnet of a fixed private IP address of the broadband access terminal.

25. The broadband access terminal of claim 24, wherein a lease associated with the IP addresses assigned by the DHCP server is less than 5 minutes.

26. The broadband access terminal of claim 24, wherein a lease associated with the IP addresses assigned by the DHCP server is less than 30 seconds.

27. A system for accessing an embedded web server of a broadband access terminal, comprising:

means for monitoring communications on at least one of a wide area network connection and a local area network connection of the broadband access terminal so as to determine at least one of a domain name server and a network gateway associated with the wide area network connection and accessed by a user terminal using the broadband access terminal;

means for detecting that the wide area network connection of the broadband access terminal is unavailable; and means for responding to communications from the user terminal to the at least one of the domain name server and the network gateway as if the at least one of the domain name server and the network gateway are accessible over the wide area network if the wide area network connection is unavailable, said means for responding comprising:

means for receiving an address resolution protocol (ARP) request;

means for determining if the ARP request is from the user terminal and to at least one of the domain name server and the network gateway; and means for sending an ARP response to the user terminal, the ARP response containing a MAC address of the at least one of the domain name server and the network gateway associated with the user terminal, if the ARP request is from the user terminal.

28. The system of claim 27, wherein the means for monitoring communications on at least one of a wide area network connection and a local area network connection of the broadband access terminal so as to determine at least one of a domain name server and a network gateway associated with the wide area network and accessed by a user terminal using the broadband access terminal comprises:

means for identifying a dynamic host configuration protocol (DHCP) packet destined for the user terminal;

means for extracting an Internet Protocol (IP) address of the user terminal from the identified DHCP packet;

means for extracting a Media Access Control (MAC) address of the user terminal from the identified DHCP packet;

means for extracting an IP address of the at least one of the domain name server and the network gateway from the identified DHCP packet;

means for determining a MAC address of the at least one of the domain name server and the network gateway based on the IP address of the at least one of the domain name server and the network gateway; and means for associating the IP address of the user terminal, the MAC address of the user terminal, the IP address of the at least one of the domain name server and the network gateway and the MAC address of the at least one of the domain name server and the network gateway.

29. The system of claim 28, wherein the means for determining a MAC address of the at least one of the domain name server and the network gateway based on the IP address of the at least one of the domain name server and the network gateway comprises:

means for sending an ARP request to the IP address of the at least one of the domain name server and the network gateway; and means for extracting the MAC address of the at least one of the domain name server and the network gateway from a response to the ARP request.

30. The system of claim 27, wherein the means for determining if the ARP request is from the user terminal and to at least one of the domain name server and the network gateway comprises:

means for determining if a source Internet Protocol (IP) address of the ARP request corresponds to an IP address of the user terminal; and means for determining if a destination IP address of the ARP request corresponds to an IP address of the at least one of the domain name server and the network gateway.

31. The system of claim 27, further comprising:

means for determining if a valid MAC address of the at least one of the domain name server and the network gateway is associated with the user terminal; and wherein the means for sending an ARP response to the user terminal, the ARP response containing a MAC address of the at least one of the domain name server and the network gateway associated with the user terminal, if the ARP request is from the user terminal comprises:

means for sending an ARP response to the user terminal, the ARP response containing a MAC address of the at least one of the domain name server and the network gateway associated with the user terminal, if the ARP request is from the user terminal and a valid MAC address of the at least one of the domain name server and the network gateway is associated with the user terminal; and means for sending an ARP response to the user terminal, the ARP response containing a MAC address of the broadband access terminal if a valid MAC address of the at least one of the domain name server and the network gateway is not associated with the user terminal.

32. The system of claim 31, further comprising:

means for detecting the availability of the wide area network connection after the wide area network connection has been detected as unavailable; and means for relaying domain name server (DNS) packets to the at least one of the domain name server and the network gateway if a valid MAC address of the at the at least one of the domain name server and the network gateway is not associated with the user terminal when the wide area network connection has been detected as available.

33. The system of claim 32, wherein the means for relaying domain name server packets to the at least one of the domain name server and the network gateway if a valid MAC address of the at the at least one of the domain name server and the network gateway is not associated with the user terminal comprises:

means for sending an address resolution protocol (ARP) request to a destination IP address of a DNS packet from the user terminal If the destination Internet Protocol (IP) address of the packet is an IP address of the at least one of the domain name server and the network gateway and a valid MAC address of the at least one of the domain name server and the network gateway is not associated with the user terminal; and means for forwarding the DNS packet to a MAC address received in response to the ARP request sent to the destination IP address of the DNS packet.

34. The system of claim 27, wherein the broadband access terminal comprises a cable modem.

35. A computer program product for accessing an embedded web server of a broadband access terminal, comprising:

a computer readable storage medium having computer readable program code embodied therein, the computer readable program code comprising:

computer readable program code which monitors communications on at least one of a wide area network connection and a local area network connection of the broadband access terminal so as to determine at least one of a domain name server and a network gateway associated with the wide area network connection and accessed by a user terminal using the broadband access terminal, wherein said program code which monitors communications is operative to perform the steps of:

receiving an address resolution protocol (ARP) request;

determining if the ARP request is from the user terminal and to at least one of the domain name server and the network gateway; and sending an ARP response to the user terminal, the ARP response containing a MAC address of the at least one of the domain name server and the network gateway associated with the user terminal, if the ARP request is from the user terminal;

computer readable program code which detects that the wide area network connection of the broadband access terminal is unavailable; and computer readable program code which responds to communications from the user terminal to the at least one of the domain name server and the network gateway as if the at least one of the domain name server and the network gateway are accessible over the wide area network if the wide area network connection is unavailable.

\* \* \* \* \*